Patented July 2, 1940

2,206,520

UNITED STATES PATENT OFFICE 2,206,520

MANGE REMEDY

Wendell H. Tisdale and Albert L. Flenner, Wilmington, Del., assignors to E. I. du Pont de Nemours & Company, Wilmington, Del., a corporation of Delaware No Drawing. Application June 22, 1937, Serial No. 149,676

1 Claim. (Cl. 167—53.2)

This invention relates to the treatment of animals affected with mange and more particularly to compositions of matter for this purpose comprising oil-in-water emulsions, characterized in that the disperse phase is a vegetable oil solution of tetra-ethyl-thiuram-monosulfide.

Effective treatments for animals affected with mange, heretofore available, have involved, almost universally, the use of compositions containing creosote or its derivatives. Such compositions, tho efficacious for this purpose are disadvantageous in a number of respects, outstanding among which is the disagreeable odor associated with creosote. Moreover, creosote and its derivatives are irritating and painful when applied to the skin of the animal treated, particularly if used in appreciable concentrations. Consequently, it is desirable to provide compositions for the treatment of mange which are not only non-toxic and non-irritating to the animal treated and to the person applying the composition, but also do not have a disagreeable odor. Particularly it is desirable to provide compositions which may be applied in concentrated form without irritation.

The use of derivatives of dithiocarbamic acid for the treatment of similar skin diseases such as are caused by bacteria, fungi, insects, and mites has been suggested by Tisdale and Williams in United States Patent 1,972,961, September 11, 1934. Compounds of this class are particularly advantageous in that they are non-toxic and non-irritating with respect to the higher animals, and in that they do not have any pronounced disagreeable odor. It is accordingly desirable to provide suitable compositions of this class which may be used effectively in the treatment of animals affected with mange.

Among the compounds disclosed by Tisdale and Williams we have found one that is a particularly efficacious remedy for mange when incorporated in a suitable vehicle. Particularly, we have found that tetra-ethyl-thiuram-monosulfide is outstanding in regard to its toxic action on the mange mite. This effectiveness, however, is manifest only when the tetra-ethyl-thiuram-monosulfide is incorporated in a suitable vehicle. For this purpose we have found oil-in-water emulsions, characterized in that the disperse phase is a vegetable oil solution of tetra-ethyl-thiuram-monosulfide, to be particularly efficacious for the treatment of animals affected with mange.

Unlike the usual creosote compositions, compositions according to this invention may be applied in highly concentrated form, if required, without danger of irritating the skin of the animal treated. Moreover, the application of these compounds is entirely free from the disagreeableness and messiness encountered in the application of creosote compositions. Animals treated with these compositions are entirely free from the sticky, messy appearance associated with corresponding treatments with creosote compositions, and in the case of household pets they may be given free run of the house without danger of contamination of the house furnishings with disagreeable odors.

Compositions according to this invention may be prepared by dissolving tetra-ethyl-thiuram-monosulfide in a suitable vegetable oil, such as coconut oil, cottonseed oil, castor oil or olive oil, and emulsifying the resulting oil solution in a suitable manner. Compositions containing a high concentration of tetra-ethyl-thiuram-monosulfide may be prepared in this manner in view of the fact that tetra-ethyl-thiuram-monosulfide, unlike the disulfides or even tetra-methyl-thiuram-monosulfide, is a liquid characterized by its high solubility in such vegetable oils.

This characteristic of tetra-ethyl-thiuram monosulfide is largely responsible for its high effectiveness in composition according to this invention, particularly as the vegetable oils contribute a penetrating effect which carries the tetra-ethyl-thiuram-monosulfide into the affected part of the skin.

In order to illustrate more fully this invention the following example, in which the parts are by weight unless otherwise specified, is given:

Example

An oil-in-water emulsion according to this invention was prepared by dissolving 1 part of tetra-ethyl-thiuram-monosulfide in 1 part of coconut oil and emulsifying 50 parts of the resulting oil solution with 48 parts of an emulsifying agent composed of 4 parts of trisodium phosphate, duodecahydrate, 12 parts of casein and 150 parts of water, and 2 parts of sodium decyl sulfate. The resulting emulsion had an almost salve-like consistency and was in the nature of a free-flowing, viscous liquid. It had the following percentage composition:

| | Per cent |
|---|---|
| Tetra-ethyl-thiuram-monosulfide | 25 |
| Coconut oil | 25 |
| Casein | 3.5 |
| Trisodium phosphate, duodecahydrate | 1 |
| Sodium decyl sulfate | 2 |
| Water | 43.5 |

In the treatment of dogs affected with mange a bath prepared by diluting one part by volume of the above composition with twenty parts by volume of water was employed. The affected dogs were washed thoroly in this bath every third day until a cure was effected. Some three to six treatments, depending upon the severity of the case, were required to effect complete cure.

The above example is illustrative of compositions according to this invention, the manner in which they are prepared and applied. It is to be understood, however, that the invention is not limited thereto, but that considerable variation may be made both in the composition and the manner in which it is applied.

Thus we may use more or less concentrated emulsions and we may vary the proportions of tetra-ethyl-thiuram-monosulfide and oil as desired, and we may apply such compositions either in the dilute or concentrated form by direct application to the affected part or by washing in the manner described.

In producing concentrated emulsions, it is desirable to include a small amount of sodium decyl sulfate, as disclosed in the example, in order to produce a more fluid emulsion. Sulfates of higher aliphatic alcohols containing more than seven carbon atoms, which are to be understood as including both the true sulfonic acids and the sulfuric acid esters of these alcohols, may be employed with like results. Preferably, these compounds are added in the form of a salt such as the sodium salt or an amine salt.

With respect to the emulsifying agent, which may or may not include the sulfate of an alcohol containing more than seven carbon atoms as disclosed above, it is apparent that any suitable emulsifying agent capable of producing oil-in-water emulsions may be employed. Such emulsifying agents are, of course, well known to those skilled in the art. In preparing concentrated emulsions, however, it is desirable that the emulsion be readily dispersible even in hard water. Consequently, we prefer to use the casein-trisodium phosphate mixture disclosed above. The stability of emulsions in hard water also is enhanced by the presence of a small amount of a sulfate of an alcohol of more than seven carbon atoms.

The compositions according to this invention are accordingly characterized by being oil-in-water emulsions in which the disperse phase is a vegetable oil solution of tetra-ethyl-thiuram-monosulfide, which may be applied with efficacious results in the treatment of animals affected with mange, which are free from irritating effects on the animal treated or on the operator, and which are free from any unpleasant and disagreeable odor.

We claim:

A composition of matter for treating skin diseases of hirsute animals which consists in an aqueous emulsion the dispersed phase of which contains tetra ethyl thiuram monosulfide dissolved in a vegetable oil in proportions of substantially 1:1 and the emulsifying agent of which is solubilized casein in an amount sufficient to produce a stable emulsion, said emulsion containing as a wetting agent a salt of a sulfate of a higher aliphatic alcohol containing more than seven carbon atoms and water so proportioned that when the emulsion is applied to a hairy portion of an animal it freely penetrates to the skin without depositing excessive and undesirable amounts of oil on the hair.

WENDELL H. TISDALE.
ALBERT L. FLENNER.